Patented Jan. 21, 1936

2,028,364

UNITED STATES PATENT OFFICE 2,028,364

PROCESS FOR PRODUCING ANTIRACHITIC SUBSTANCES

James Waddell, Metuchen, N. J., assignor, by mesne assignments, to E. I. du Pont de Nemours & Co., Wilmington, Del., a corporation of Delaware No Drawing. Application May 16, 1933, Serial No. 671,367

4 Claims. (Cl. 167—81)

This invention relates to a process for producing increased yields of substances having high antirachitic values, and more particularly refers to a process for producing antirachitically activatable supplements in substances which are deficient or entirely lacking in such supplements.

In its preferred embodiment this invention concerns methods whereby substantial quantities of antirachitically activatable substances are produced in compounds which prior to such treatment did not contain these substances or contained them only in very minute amounts. The substances which are especially adapted to this treatment are lipoid-containing compounds, particularly those compounds containing unsaponifiable lipoids, such as cholesterol. Among these preferred compounds may be mentioned the various sterols, derived from both animal and plant sources.

It is well known that numerous edible compounds may be irradiated with ultra violet light, resulting in the development of antirachitic properties therein. This process has been described in Steenbock Patent 1,680,818, issued August 14, 1928. More recently it has been determined that unsaponifiable lipoidal extracts obtained from various foodstuffs might be irradiated with ultra violet light in order to impart antirachitic properties thereto. Steenbock Patent 1,871,136, issued August 9, 1932, describes means for attaining this result.

It is also known that ergosterol may be irradiated with ultra violet light to produce a product having antirachitic properties. Windaus Patent 1,873,942, issued August 23, 1932, discloses such a process.

It may here be pointed out that all of these processes were dependent upon a source of material containing appreciable quantities of ergosterol. Materials containing no ergosterol, or only minute quantities thereof, were universally conceded to be of not value whatsoever, as far as a source of antirachitic supplements was concerned.

It is an object of the present invention to utilize the vast quantities of lipoid-containing substances, particularly cholesterol, which substances were formerly of no value in the production of antirachitic supplements due to the exceedingly small quantities of activatable substituents which they contain. An additional object is to produce high yields of activatable constituents from these substances. A further object is to produce antirachitic supplements from these activatable constituents, which supplements are surprisingly more effective in curing rickets, particularly in poultry, than a similar quantity of vitamin obtained from ergosterol. A still further object is to utilize substances from which the activatable constituents have been substantially or completely removed, and to produce therefrom large amounts of activatable constituents. Additional objects will become apparent from a consideration of the following description.

These objects are attained according to the herein described invention, which in its preferred embodiment comprises heating lipoid-containing substances, preferably in the presence of water, and simultaneously or subsequently activating the activatable constituents produced thereby with ultra violet light or other activating media. Cholesterol is, in general, the preferred source of material from which activatable substances are produced according to the present invention. Other lipoid-containing compounds may also be used, although more advantageous results are usually obtained by utilizing cholesterol, for reasons which will hereafter be stated in detail.

The invention may be more fully understood by a consideration of the following illustrative example:

Example 1 gram of cholesterol deficient in activatable constituents was placed in a large glass test tube with 10 cubic centimeters of distilled water. The test tube with its contents was then placed in a metal tube, constructed from a 10 inch piece of copper pipe 1¼ inches in diameter and fitted at both ends with bronze caps. A small amount of water was also placed in the copper tube, and both ends were then closed with the bronze caps in such manner as to be air- and vapor-tight. The tube was placed in an upright position in an electric oven and heated to a temperature of 190° C., which temperature was maintained for a period of 2½ hours. At the end of this time the tube was removed from the oven and allowed to cool. It was then opened, the glass test tube removed therefrom, and the treated cholesterol separated from the water by filtration.

This cholesterol was dissolved in warm 95% ethyl alcohol and irradiated in a quartz flask under a quartz mercury vapor lamp. The irradiated solution was assayed on rachitic rats and was found to possess a vitamin activity of from 100–150 times the activity of an alcoholic solution of an equivalent sample of cholesterol, which had been irradiated under identical conditions, but which had not been subjected to heat treatment in the presence of water.

Similar tests were conducted using different temperatures as well as different periods of heating. In each case the results were far superior to those obtained from equivalent samples of cholesterol which had not been subjected to heat treatment in the presence of water. For example, samples were heated in the presence of water, according to the instructions previously given, at temperatures of 113° C. and 150° C. These results were comparable with those wherein the sample was heated to 190° C., although the period of heating was considerably longer. In the case of the samples heated at 113° C. the period of heating lasted for from 13–17 hours.

The surprising phenomenon was noticed that this extended heating did not apparently destroy the activatable constituents produced according to my invention. When it is considered that a sample of cholesterol which was heated in the dry state for such extended periods loses a large portion of the activatable constituents formed therein, it is indeed surprising to discover that the addition of water apparently prevents such destruction.

Although the preferred form of my invention comprises heating lipoid-containing substances in the presence of water prior to or simultaneously with treatment to produce activation, nevertheless I have found that results greatly superior to those obtained according to the prior art may be produced by merely heating the material without the addition of water. Where water is not added it is advisable to reduce the period of heating, since prolonged heating apparently results in the destruction of the activatable constituents formed, as previously mentioned.

For example, a sample of cholesterol which was deficient in activatable constituents was heated for a period of 45 minutes, and subsequently irradiated with ultra violet light. The product showed a marked advantage over an equivalent sample of cholesterol which had been activated without prior or simultaneous heat treatment. This latter sample showed practically no antirachitic properties, whereas the heat treated sample evidenced appreciable curative powers when tested on rachitic rats.

Additional samples of cholesterol, deficient in activatable constituents, were heated without the addition of water at 190° C. for periods ranging from 45 minutes to 7½ hours, prior to activation. These samples all evidenced marked antirachitic properties. However, heating for periods of more than 2½ hours at this temperature did not improve the antirachitic properties of the resulting products, and in the case of the more extended heat treatment apparently depreciated these properties to a certain extent.

By carrying out this heat treatment simultaneously with the activation treatment somewhat higher antirachitic properties were noted in the resulting products. This was also found to be the case where water was added to the sample, although, as previously mentioned in this connection, the antirachitic properties were greatly superior where treatment was carried out in the presence of water.

Antirachitic supplements obtained from cholesterol according to my heretofore described processes, were tested on rats to determine their antirachitic value. These supplements were then tested on baby chicks. I was greatly surprised to find that only $\frac{1}{10}$–$\frac{1}{20}$ the amount of these supplements was required to prevent leg weakness in growing chicks, as was required when irradiated ergosterol was used—these amounts being expressed in terms of "rat units." This seems to indicate that the antirachitic vitamin which is present in irradiated ergosterol is entirely different from that which is present in the supplements which I have obtained, the vitamin from irradiated ergosterol being much less efficacious than the vitamin produced according to my invention.

I have also found that by evaporating water or water-containing solvents from cholesterol deficient in activatable constituents a noticeable increase in the quantity of activatable constituents is obtained. This evaporation may advantageously be carried out in an open dish over a heated water bath.

Likewise, the addition of a dilute acid to the water-containing solution of cholesterol prior to or during the heating of this solution, results in the production of an even greater amount of activatable constituents than would have been obtained in the absence of such acids. Acids which have been found to give satisfactory results are dilute mineral or organic acids, such as dilute solutions of acetic or sulfuric acid. Furthermore, mixtures of these acids may be added with good results.

The addition of wetting agents to the water-containing solution of cholesterol or of lipoidal compounds is also advantageous. Such wetting or dispersing agents apparently serve to bring the lipoidal compounds into closer or more intimate contact with the water and hasten the hydration or isomerization which I believe takes place in the formation of activatable constituents. Among the wetting agents which have evidenced satisfactory results may be mentioned bile salts.

Additional experiments have shown that improved results may be obtained by irradiating the compounds to be activated in water-containing solvents to which have been added small amounts of metallic salts, for example, salts of iron, copper and cobalt. The presence of these salts apparently catalyzes the production of activatable constituents in the compounds being activated, and results in an increased yield of such constituents.

It is to be understood that my process is not limited to substances which contain little or no activatable constituents, since it may also be applied to those substances which contain appreciable amounts of such constituents. Likewise, it is to be understood that my process comprises the separation of the activated material from the remainder, and the repeated application of this process to the unactivated material. In other words, I may take lipoid-containing substances which are low or entirely lacking in activatable constituents, or which contain appreciable quantities of such constituents, and subject these substances to treatment according to one or more of the hereinbefore described processes. The activated constituents produced thereby may then be separated from the residuary material, and this material resubjected to treatment. This separation and re-treatment may be continued almost indefinitely, and is governed largely by economical considerations.

In this connection it is interesting to note that when cholesterol, for instance, is irradiated in the dry condition, the activated material separated from the residue and the latter reirradiated, the amount of activated material produced by the fifth irradiation is only $\frac{1}{150}-\frac{1}{100}$ of the amount that was produced by the first irradiation. However, when this residue is heated according to my process, preferably in the presence of water, and simultaneously or subsequently activated, the amount of activated material produced by each subsequent treatment is surprisingly high. In fact I have found that the amount of activated material produced per gram of residuary material treated is substantially the same, regardless of whether the residuary material has been subjected to one or more prior treatments.

My invention is not confined to the treatment of sterols by means of heat, or heat and water, but also includes heat treatment of these sterols in the presence of a solvent containing water. For example the material to be treated may be dissolved in a suitable solvent and water added thereto. This material may then be heated and subsequently activated, or it may be heated and activated simultaneously.

The amount of water added is preferably several times the amount of material to be treated. However, smaller or larger amounts of water may be used with excellent results. Of course, the particular amounts required depends to a considerable extent upon the material to be treated, and since this invention is applicable to numerous sterols and lipoid-containing substances, obtained from both plant and animal sources, exact limits cannot be given.

The means of activation are also capable of wide variation, and it is understood that this invention is not dependent upon irradiation with ultra violet light. My process may be carried out with excellent results by the use of various activating media. For instance, X-rays or cathode rays may be used, although ultra violet irradiation appears to be more satisfactory. Also, other activating media may be used.

Heat treatment in the presence of water seems somewhat more efficient where this is carried out under pressure, although quite satisfactory results are obtained by treatment under atmospheric or even sub-atmospheric conditions. The temperatures employed, as previously mentioned, may vary over a broad range. In general higher temperatures permit the desired results to be obtained in less time. Due to the numerous compounds and mixtures of compounds which may be treated the most efficient temperature will depend upon the particular material to be processed, and the facilities available.

While I do not wish to base my invention upon any specific theory, nevertheless, it is my belief that in the transformation of the sterols and lipoidal compounds which I have mentioned into activatable substances there occurs a transformation, rearrangement or isomerization which results from the application of heat, and is catalyzed by water or in which water takes part. This chemical change is also apparently aided by the various factors heretofore mentioned, such as temperature, time, the presence of wetting agents, metallic salts, et cetera.

The present invention permits the production of enormous quantities of activatable material from compounds which formerly were deficient or entirely lacking in such material. It may be applied to those compounds from which the activatable constituents have been in large part removed, and which were then discarded as of no further use in the production of antirachitic supplements. When one considers the tremendous quantities of lipoid-containing substances, available but heretofore of no practical use, it is at once evident that my invention is of far-reaching importance.

The antirachitic supplements produced according to this invention, particularly those supplements produced from cholesterol, are surprisingly efficacious in the cure of rickets in poultry. They are from 30-50 times as potent as irradiated ergosterol. This discovery is therefore of great interest, since the products may be mixed with food or other inert materials, or placed in solution, and consumed in quantities sufficient to cure or prevent rickets. Since these amounts are considerably less than in the case of irradiated ergosterol, and since the source of the material is so much cheaper and more readily available, there can be no doubt that this invention will result in a pronounced change in the methods of treatment formerly practiced.

As many apparently widely different embodiments of this invention may be made without departing from the spirit and scope thereof, it is to be understood that I do not limit myself to the specific embodiments thereof except as defined in the appended claims.

I claim:

1. A process for producing antirachitic substances which comprises activating lipoid-containing compounds heated to a temperature above 100° C. in the presence of a quantity of water which is greater than the amount of lipoid-containing compounds, the period of heating being sufficient to increase the amount of activatable constituents present but so limited as to prevent substantial injury to such constituents.

2. A process for producing antirachitic substances which comprises activating cholesterol heated to a temperature above 100° C. in the presence of a quantity of water which is greater than the amount of lipoid-containing compounds, the period of heating being sufficient to increase the amount of activatable constituents present but so limited as to prevent substantial injury to such constituents.

3. A process for producing antirachitic substances which comprises activating with ultra violet light cholesterol heated to a temperature above 100° C. in the presence of a quantity of water which is greater than the amount of lipoid-containing compounds, the amount of water present being several times the amount of cholesterol, and the period of heating being sufficient to increase the amount of activatable constituents present but so limited as to prevent substantial injury to such constituents.

4. A process for producing antirachitic substances which comprises suspending cholesterol in a quantity of water which is greater than the amount of cholesterol, heating the resulting suspension in a closed container to a temperature sufficiently high to produce a superatmospheric pressure therein, the period of heating being sufficient to increase the amount of activatable constituents present but so limited as to prevent substantial injury to such constituents, and subjecting the treated product to ultra violet irradiation.

JAMES WADDELL.